US012567354B2

(12) United States Patent
Choi et al.

(10) Patent No.: US 12,567,354 B2
(45) Date of Patent: Mar. 3, 2026

(54) DISPLAY DEVICE AND METHOD OF DRIVING THEREOF

(71) Applicant: SAMSUNG DISPLAY CO., LTD., Yongin-si (KR)

(72) Inventors: Youngwoon Choi, Seoul (KR); Sungjae Park, Seongnam-si (KR); Seunghwan Park, Anyang-si (KR); Jinho Lee, Hwaseong-si (KR); Namjae Lim, Gwacheon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/811,054

(22) Filed: Aug. 21, 2024

(65) Prior Publication Data

US 2024/0412680 A1 Dec. 12, 2024

Related U.S. Application Data

(63) Continuation of application No. 17/823,182, filed on Aug. 30, 2022, now Pat. No. 12,087,207.

(30) Foreign Application Priority Data

Nov. 19, 2021 (KR) ........................ 10-2021-0160599

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01);
(Continued)

(58) Field of Classification Search
CPC .. G09G 3/3208; G09G 3/3233; G09G 3/2003; G09G 3/2007; G09G 2330/021;
(Continued)

(56) References Cited

U.S. PATENT DOCUMENTS 9,672,792 B2 6/2017 Choi et al.
10,297,184 B2 5/2019 Jeong et al.
(Continued)

FOREIGN PATENT DOCUMENTS

KR 10-1954934 3/2019
KR 10-2074719 2/2020
(Continued)

OTHER PUBLICATIONS

Notice of Allowance dated May 10, 2024 in corresponding U.S. Appl. No. 17/823,182.

(Continued)

*Primary Examiner* — Priyank J Shah
(74) *Attorney, Agent, or Firm* — F. CHAU & ASSOCIATES, LLC

(57) ABSTRACT

A display device includes a display panel, a driving controller, and a voltage generator. The display panel includes a plurality of pixels. Each of the pixels receives a driving voltage through a first voltage line. The driving controller receives an input image signal including first to third color signals and outputs a voltage control signal for controlling a voltage level of the driving voltage based on the first to third color signals. The voltage generator provides the driving voltage to the first voltage line and determines the voltage level of the driving voltage based on the voltage control signal. The driving controller determines first to third gate-source voltages respectively corresponding to the first to third color signals and outputs the voltage control signal based on the first to third gate-source voltages.

16 Claims, 14 Drawing Sheets

(52) U.S. Cl.
CPC ............... *G09G 2300/0819* (2013.01); *G09G 2300/0842* (2013.01); *G09G 2330/021* (2013.01); *G09G 2330/028* (2013.01)

(58) Field of Classification Search
CPC ......... G09G 2330/028; G09G 2360/16; G09G 2300/0819; G09G 2320/0233
See application file for complete search history.

(56) References Cited

U.S. PATENT DOCUMENTS

| | | | | |
|---|---|---|---|---|
| 10,325,552 | B2 | 6/2019 | Jeong et al. | |
| 2012/0256936 | A1* | 10/2012 | Lee | G09G 3/3225 345/549 |
| 2014/0218421 | A1* | 8/2014 | Lee | G09G 3/3208 345/77 |
| 2014/0285535 | A1 | 9/2014 | Pyo | |
| 2015/0243211 | A1 | 8/2015 | Pyo | |
| 2015/0255019 | A1* | 9/2015 | Park | G09G 3/3225 345/208 |
| 2019/0237025 | A1 | 8/2019 | Keum | |
| 2021/0020144 | A1* | 1/2021 | Sun | G06F 3/0346 |
| 2023/0162655 | A1 | 5/2023 | Choi et al. | |

FOREIGN PATENT DOCUMENTS

| | | |
|---|---|---|
| KR | 10-2205798 | 1/2021 |
| KR | 10-2294633 | 8/2021 |

OTHER PUBLICATIONS

Final Office Action dated Jan. 31, 2024 in corresponding U.S. Appl. No. 17/823,182.

* cited by examiner

DISPLAY DEVICE AND METHOD OF DRIVING THEREOF

CROSS-REFERENCE TO RELATED APPLICATIONS

This U.S. non-provisional patent application is a continuation of U.S. patent application Ser. No. 17/823,182 filed on Aug. 30, 2022, which claims priority under 35 U.S.C. § 119 Korean Patent Application No. 10-2021-0160599 filed on Nov. 19, 2021, in the Korean Intellectual Property Office, the disclosures of which are incorporated by reference in their entirety herein.

1. TECHNICAL FIELD

Embodiments of the present disclosure described herein relate to a display device.

2. DISCUSSION OF RELATED ART

Electronic devices such as a smart phone, a digital camera, a notebook computer, a navigation system, a monitor, and a smart television that provide images to a user include a display device for displaying the images. The display device generates an image and then provides the user with the generated image through a display panel.

The display device includes a plurality of pixels and driving circuits for controlling the plurality of pixels. Each of the plurality of pixels includes a light emitting element and a pixel circuit for controlling the light emitting element. The pixel circuit may include a plurality of transistors connected to one another.

The display device may apply a data signal to the display panel to display a predetermined image as a current corresponding to the data signal supplied to the light emitting element. A desired image may be displayed by adjusting the amount of current supplied to the light emitting element.

SUMMARY

At least one embodiment of the present disclosure provides a display device that reduces power consumption.

According to an embodiment, a display device includes a display panel, a driving controller, and a voltage generator. The display panel includes a plurality of pixels. Each of the pixels receives a driving voltage through a first voltage line. The driving controller determines a gate-source voltage based on an input image signal and generates a voltage control signal for controlling a voltage level of the driving voltage based on the gate-source voltage. The voltage generator sets the voltage level of the driving voltage based on the voltage control signal and provides the driving voltage to the first voltage line.

In an embodiment, the input image signal may include first to third color signals. The driving controller may determine first to third gate-source voltages respectively corresponding to the first to third color signals and may output the voltage control signal based on the first to third gate-source voltages.

In an embodiment, the driving controller may output the voltage control signal corresponding to the highest voltage level among the first to third gate-source voltages.

In an embodiment, the driving controller may include an image processor outputting a voltage selection signal based on the first to third gate-source voltages respectively corresponding to the first to third color signals and a voltage controller outputting the voltage control signal in response to the voltage selection signal.

In an embodiment, the image processor may include a first image analyzer outputting the first gate-source voltage corresponding to the first color signal, a second image analyzer outputting the second gate-source voltage corresponding to the second color signal, a third image analyzer outputting the third gate-source voltage corresponding to the third color signal, and a driving voltage selector selecting one gate-source voltage corresponding to the highest voltage level among the first to third gate-source voltages and outputting the voltage selection signal corresponding to the selected gate-source voltage.

In an embodiment, the first image analyzer may output the first gate-source voltage corresponding to the highest grayscale level of the first color signal during one frame. The second image analyzer may output the second gate-source voltage corresponding to the highest grayscale level of the second color signal during one frame. The third image analyzer may output the third gate-source voltage corresponding to the highest grayscale level of the third color signal during one frame.

In an embodiment, the driving voltage selector may determine an image pattern of the input image signal, may determine an offset voltage corresponding to the determined image pattern, and may output the voltage selection signal based on the selected gate-source voltage and the offset voltage.

In an embodiment, when the image pattern of the input image signal corresponds to a voltage drop pattern, the driving controller may determine the offset voltage such that the voltage level of the driving voltage is increased.

In an embodiment, the plurality of pixels may be positioned in a first direction and a second direction intersecting the first direction. The first voltage line may include a plurality of sub voltage lines, each of which extends in the second direction and are positioned spaced from one another in the first direction. The plurality of pixels are connected to a corresponding sub voltage line among the plurality of sub voltage lines.

In an embodiment, when the highest grayscale level of the image pattern is greater than a reference level and a length of the image pattern in the second direction is greater than a reference value, the driving controller may determine that the image pattern corresponds to the voltage drop pattern.

In an embodiment, the plurality of pixels may include first to third color pixels. The first to third color signals may be provided to the first to third color pixels, respectively.

According to an embodiment, a display device includes a display panel, a driving controller, and a voltage generator. The display panel includes a plurality of pixels. Each of the pixels receives a driving voltage through a first voltage line. The driving controller outputs a voltage control signal. The voltage generator provides the driving voltage to the first voltage line and determines a voltage level of the driving voltage based on the voltage control signal. The driving controller determines a gate-source voltage corresponding to an input image signal, determines an offset voltage corresponding to an image pattern of the input image signal, and generates the voltage control signal based on the first gate-source voltage and the offset voltage.

In an embodiment, the input image signal may include first to third color signals. The driving controller may determine first to third gate-source voltages respectively corresponding to the first to third color signals and may output the voltage control signal based on the first to third gate-source voltages and the offset voltage.

In an embodiment, the driving controller may output the voltage control signal based on the offset voltage and a gate-source voltage corresponding to the highest voltage level among the first to third gate-source voltages.

In an embodiment, the driving controller may include an image processor outputting a voltage selection signal based on the offset voltage and the first to third gate-source voltages respectively corresponding to the first to third color signals and a voltage controller outputting the voltage control signal in response to the voltage selection signal.

In an embodiment, the image processor may include a first image analyzer outputting the first gate-source voltage corresponding to the first color signal, a second image analyzer outputting the second gate-source voltage corresponding to the second color signal, a third image analyzer outputting the third gate-source voltage corresponding to the third color signal, and a driving voltage selector selecting one gate-source voltage corresponding to the highest voltage level among the first to third gate-source voltages and to output the voltage selection signal based on the offset voltage and the selected gate-source voltage.

In an embodiment, the first image analyzer may output the first gate-source voltage corresponding to the highest grayscale level of the first color signal during one frame. The second image analyzer may output the second gate-source voltage corresponding to the highest grayscale level of the second color signal during one frame. The third image analyzer may output the third gate-source voltage corresponding to the highest grayscale level of the third color signal during one frame.

In an embodiment, when the image pattern of the input image signal corresponds to a voltage drop pattern, the driving controller may determine the offset voltage such that the voltage level of the driving voltage is increased.

According to an embodiment, a driving method of a display device includes determining a first gate-source voltage from a first color signal of an input image signal, determining a second gate-source voltage from a second color signal of the input image signal, generating a third gate-source voltage from a third color signal of the input image signal, changing a voltage level of a driving voltage based on the first to third gate-source voltages, and providing the driving voltage to a plurality of pixels of the display device.

In an embodiment, the changing of the voltage level of the driving voltage may include selecting one gate-source voltage corresponding to the highest voltage level among the first to third gate-source voltages and changing a voltage level of the driving voltage based on the selected gate-source voltage.

In an embodiment, the changing of the voltage level of the driving voltage may include determining an offset voltage corresponding to an image pattern of the input image signal and changing the voltage level of the driving voltage based on the selected gate-source voltage and the offset voltage.

In an embodiment, the plurality of pixels may include first to third color pixels. The first to third color signals may be provided to the first to third color pixels, respectively.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
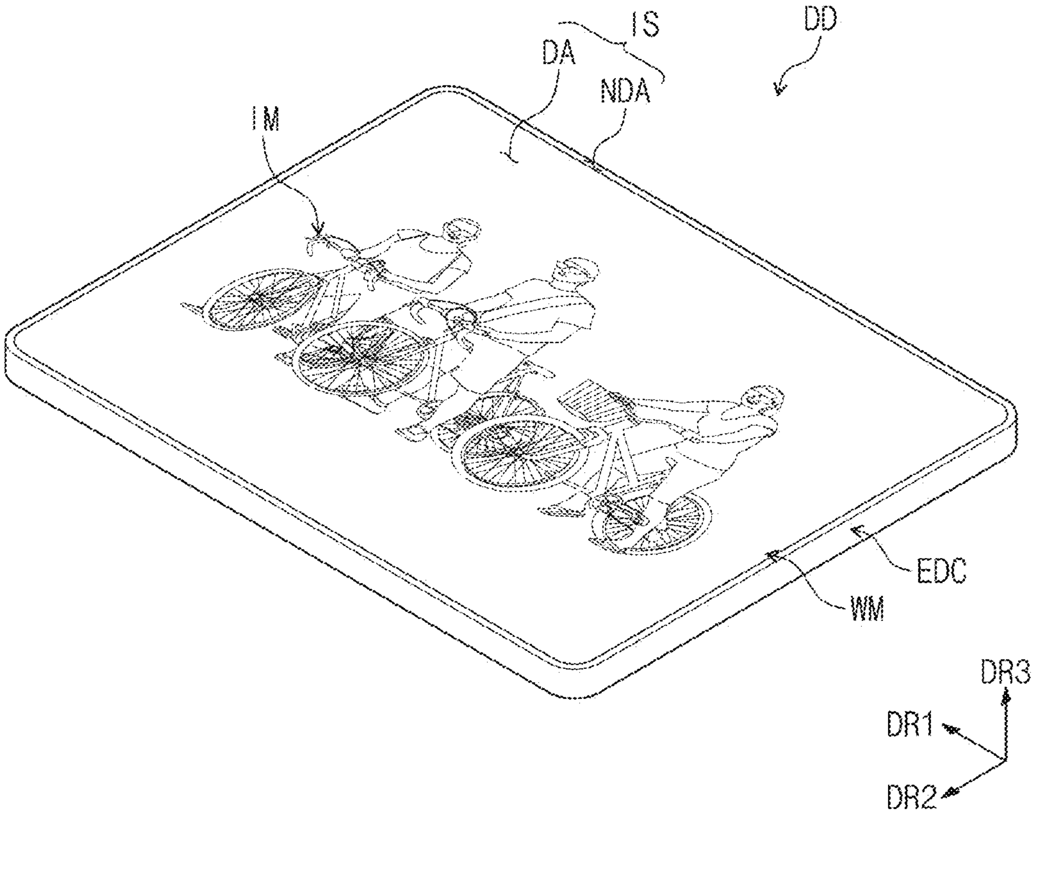
FIG. 1 is a perspective view of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components may be exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

Figure 2:
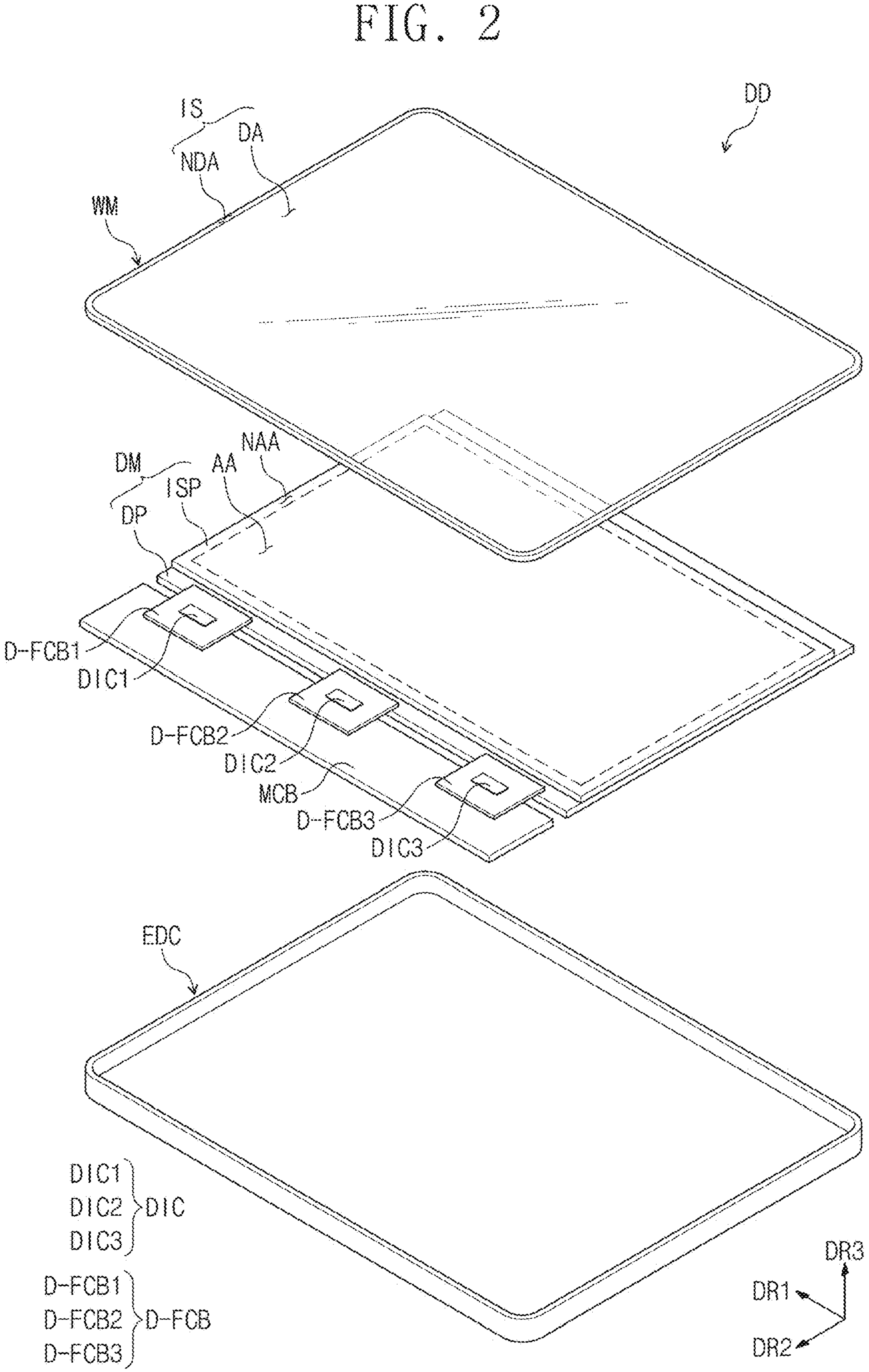
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD according to the present disclosure may be a small and medium-sized electronic device, such as a mobile phone, a tablet PC, a notebook computer, a vehicle navigation system, or a game console, as well as a large-sized electronic device, such as a television or a monitor. The above examples are provided merely as examples since the display device DD may be applied to other display device(s) without departing from the concept of the present disclosure. The display device DD is in a shape of a rectangle having a long side in a first direction DR1 and a short side in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, light, heat, his/her eye, and pressure, or a combination thereof. Also, the display device DD may sense the external input of the user applied to a side surface or a rear surface of the display device DD depending on a structure of the display device DD, but is not limited thereto. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. The user perceives (or views) the image IM through the display area DA. In an embodiment, the display area DA is illustrated in the shape of a quadrangle whose vertexes are rounded. However, this is illustrated merely as an example since ® display area DA may have various shapes.

The non-display area NDA is adjacent to the display area DA. The non-display area NDA may have a given color. The non-display area NDA may surround the display area DA. As such, a shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to a specific embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot and a quantum rod. Hereinafter, a description is provided under the assumption that the display panel DP is an organic light emitting display panel in an embodiment.

The display panel DP may output the image IM, and the output image IM may be displayed through the display surface IS.

The input sensing layer ISP may be disposed on the display panel DP so as to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, embodiments of the disclosure are not limited thereto. For example, the window WM may include a plurality of layers.

The non-display area NDA of the display device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed, for example, in a coating manner.

The window WM may be coupled to the display module DM through an adhesive film. As an example of the present disclosure, the adhesive film may include an optically clear adhesive (OCA) film. However, the adhesive film is not limited thereto. For example, the adhesive film may include a adhesive or sticking agent. For example, the adhesive film may include an optically clear resin (OCR) or a pressure sensitive adhesive (PSA) film.

An anti-reflection layer may be further interposed between the window WM and the display module DM. The anti-reflection layer decreases reflectivity of an external light incident from above the window WM. The anti-reflection layer according to an embodiment of the present disclosure may include a retarder and a polarizer. The retarder may have a film type or a liquid crystal coating type and may include a half-wavelength V/2 retarder and/or a quarter-wavelength V/4 retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined in consideration of colors of light generated from a plurality of pixels PX (refer to FIG. 3) included in the display panel DP. Also, the anti-reflection layer may further include a light blocking pattern.

The display module DM may display the image IM depending on an electrical signal and may transmit/receive information about an external input. The display module DM may be defined by an active area AA and an inactive area NAA. The active area AA may be defined as an area through which the image IM provided from the display area DA is output. Also, the active area AA may be defined as an area in which the input sensing layer ISP senses an external input applied from the outside.

The inactive area NAA is adjacent to the active area AA. For example, the inactive area NAA may surround the active area AA. However, this is illustrated by way of an example. The inactive area NAA may be defined in various shapes and is not limited to a specific embodiment. According to an embodiment, the active area AA of the display module DM may correspond to at least part of the display area DA.

The display module DM may further include a main circuit board MCB, flexible circuit films D-FCB, and driver chips DIC. The main circuit board MCB may be connected to the flexible circuit films D-FCB so as to be electrically connected to the display panel DP. The flexible circuit films D-FCB are connected to the display panel DP so as to electrically connect the display panel DP to the main circuit board MCB. The main circuit board MCB may include a plurality of driving elements. The plurality of driving elements may include a circuit unit for driving the display panel DP. The driver chips DIC may be mounted on the flexible circuit films D-FCB, respectively.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be positioned spaced from one another in the first direction DR1 and may be connected with the display panel DP so as to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, an embodiment of the present disclosure is not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

The input sensing layer ISP may be electrically connected with the main circuit board MCB through the flexible circuit films D-FCB. However, embodiments of the present disclosure are not limited thereto. That is, the display module DM may additionally include a separate flexible circuit film for electrically connecting the input sensing layer ISP and the main circuit board MCB.

The display device DD further includes an outer case EDC accommodating the display module DM. The outer case EDC may be coupled to the window WM so as to define an exterior appearance of the display device DD. The outer case EDC may absorb external shocks and may prevent a foreign material/moisture or the like from infiltrating the display module DM such that components accommodated in the outer case EDC are protected. Meanwhile, as an example of the present disclosure, the outer case EDC may be provided in the form of a combination of a plurality of accommodating members.

The display device DD according to an embodiment may further include an electronic module including various functional modules for operating the display module DM, a power supply module (e.g., a battery) for supplying a power necessary for overall operations of the display device DD, a bracket coupled with the display module DM and/or the outer case EDC to partition an inner space of the display device DD, etc.

Figure 3:
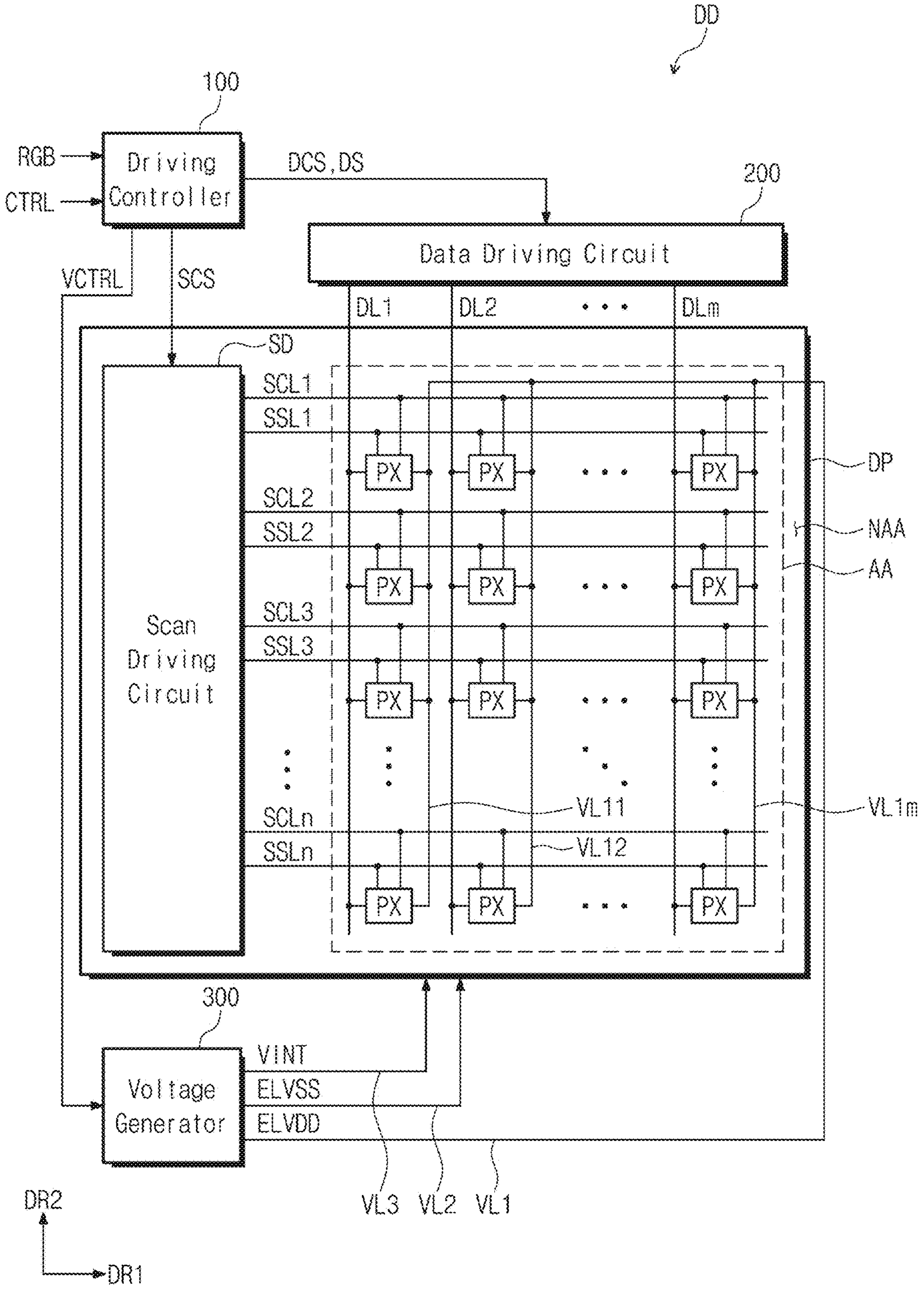
FIG. 3 is a block diagram of a display device, according to an embodiment of the present disclosure.

FIG. 3 is a block diagram of a display device, according to an embodiment of the present disclosure.

Referring to FIG. 3, the display device DD includes a driving controller 100 (e.g., a control circuit), a data driving circuit 200, a voltage generator 300, and a display panel DP.

The driving controller 100 receives an input image signal RGB and a control signal CTRL. The driving controller 100 generates an output image signal DS by converting a data format of the input image signal RGB so as to be suitable for the interface specification of the data driving circuit 200. The driving controller 100 outputs a scan control signal SCS and a data control signal DCS. In an embodiment, the driving controller 100 may output a voltage control signal VCTRL for controlling the voltage generator 300. The voltage control signal VCTRL may indicate to the voltage generator 300 on how to set driving voltage ELVDD. For example, the voltage control signal VCTRL may include a first bit pattern whose first value indicates one of a plurality of different driving voltages. In another example, the voltage control signal VCTRL includes the first bit pattern and a second other bit pattern whose second value indicates one of a plurality of different offset voltages.

The data driving circuit 200 receives the data control signal DCS and the output image signal DS from the driving controller 100. The data driving circuit 200 converts the output image signal DS into data signals and then outputs the data signals to a plurality of data lines DL1 to DLm to be described later. Each of the data signals may have a voltage level corresponding to a grayscale value of the output image signal DS. The data driving circuit 200 may be disposed in the driver chips DIC shown in FIG. 2.

The display panel DP includes first scan lines SCL1 to SCLn, second scan lines SSL1 to SSLn, the data lines DL1 to DLm, and pixels PX. The display panel DP may further include a scan driving circuit SD. In an embodiment, the scan driving circuit SD is arranged on a first side of the display panel DP. The first scan lines SCL1 to SCLn and the second scan lines SSL1 to SSLn extend in the first direction DR1 from the scan driving circuit SD.

The driving controller 100, the data driving circuit 200, and the scan driving circuit SD may be a driving circuit for providing a data signal to the pixels PX of the display panel DP.

The display panel DP may be divided into the active area AA and the inactive area NAA. The pixels PX may be positioned in the active area AA. The scan driving circuit SD may be positioned in the inactive area NAA.

The first scan lines SCL1 to SCLn and the second scan lines SSL1 to SSLn are positioned spaced from each other in the second direction DR2. The data lines DL1 to DLm extend from the data driving circuit 200 in a direction opposite to the second direction DR2, and are arranged spaced from one another in the first direction DR1.

The plurality of pixels PX are electrically connected to the first scan lines SCL1 to SCLn, the second scan lines SSL1 to SSLn, and the data lines DL1 to DLm. For example, the first row of pixels may be connected to the scan lines SCL1 and SSL1. Moreover, the second row of pixels may be connected to the scan lines SCL2 and SSL2.

Each of the plurality of pixels PX includes a light emitting element ED (refer to FIG. 4) and a pixel circuit PXC (refer to FIG. 4) for controlling the light emission of the light emitting element ED. The pixel circuit PXC may include a plurality of transistors and at least one capacitor. The scan driving circuit SD may include transistors formed through the same process as the pixel circuit PXC. In an embodiment, the light emitting element ED may be an organic light emitting diode. However, the present disclosure is not limited thereto.

Each of the plurality of pixels PX receives a first driving voltage ELVDD, a second driving voltage ELVSS, and an initialization voltage VINT. The second driving voltage ELVSS may be lower than the first driving voltage ELVDD.

The scan driving circuit SD receives the scan control signal SCS from the driving controller 100. In response to the scan control signal SCS, the scan driving circuit SD may output first scan signals to the first scan lines SCL1 to SCLn and may output second scan signals to the second scan lines SSL1 to SSLn. The circuit configuration and operation of the scan driving circuit SD will be described in detail later.

In an embodiment, the scan driving circuit SD is disposed on the first side of the display area DA, but the present disclosure is not limited thereto. In an embodiment, the scan driving circuit SD may be disposed on the first side and the second side of the active area AA. For example, the scan driving circuit SD may include a first circuit located on the first side for driving odd lines and a second circuit located on the second side for driving even lines, but is not limited thereto.

The voltage generator 300 generates voltages used to operate the display panel DP. In an embodiment, the voltage generator 300 generates a first driving voltage ELVDD, a second driving voltage ELVSS, and an initialization voltage VINT, which are used for an operation of the display panel DP. The first driving voltage ELVDD, the second driving voltage ELVSS and the initialization voltage VINT may be provided to the display panel DP through a first voltage line VL1, a second voltage line VL2, and a third voltage line VL3, respectively.

In an embodiment, the voltage line VL1 may include sub voltage lines VL11 to VL1*m*. Each of the sub voltage lines VL11 to VL1*m* may extend in the second direction DR2 and may be disposed spaced apart from each other in the first direction DR1.

As well as the first driving voltage ELVDD, the second driving voltage ELVSS, and the initialization voltage VINT, the voltage generator 300 may further generate various voltages used for operations of the display panel DP and the scan driving circuit SD.

In an embodiment, the driving controller 100 may output a voltage control signal VCTRL for controlling the voltage generator 300 based on a characteristic of the input image signal RGB, for example, a grayscale level of the input image signal RGB, an image pattern, or the like.

In an embodiment, the driving controller 100 and the voltage generator 300 may be respectively implemented as integrated circuits and may be mounted on the main circuit board MCB shown in FIG. 2. In an embodiment, the driving controller 100 may be positioned in the driving chips DIC shown in FIG. 2 together with the data driving circuit 200. The configuration and operation of the driving controller 100 will be described in detail later.

Figure 4:
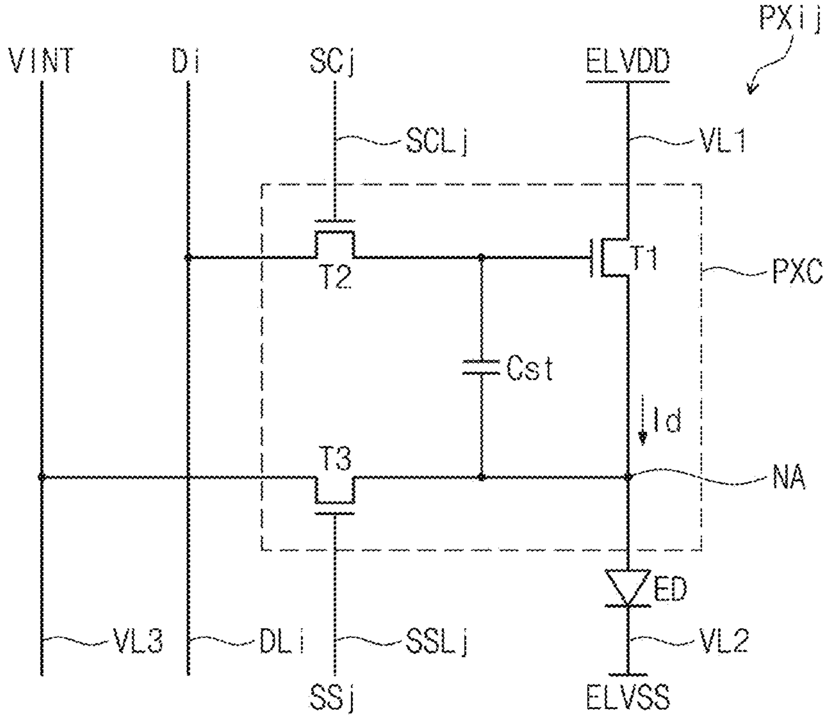
FIG. 4 is an equivalent circuit diagram of a pixel, according to an embodiment of the present disclosure.

FIG. 4 is an equivalent circuit diagram of a pixel, according to an embodiment of the present disclosure.

FIG. 4 illustrates an equivalent circuit diagram of a pixel PXij connected to an i-th data line DLi among the data lines DL1 to DLm, a j-th first scan line SCLj among the first scan lines SCL1 to SCLn, and a j-th second scan line SSLj among the second scan lines SSL1 to SSLn, which are illustrated in FIG. 1.

Each of the plurality of pixels PX shown in FIG. 1 may have the same circuit configuration as the equivalent circuit diagram of the pixel PXij shown in FIG. 4. In an embodiment, the pixel PXij includes the at least one light emitting element ED and the pixel circuit PXC.

The pixel circuit PXC may include at least one transistor, which is electrically connected to the light emitting element ED and which is used to provide a current corresponding to the data signal Di delivered from the data line DLi to the light emitting element ED. In an embodiment, the pixel circuit PXC of the pixel PXij includes a first transistor T1, a second transistor T2, a third transistor T3, and a capacitor Cst. Each of the first to third transistors T1 to T3 is an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In an embodiment, at least one of the first to third transistors T1 to T3 may be an N-type transistor and the rest may be P-type transistors. Moreover, the circuit configuration of a pixel according to an embodiment of the present disclosure is not limited to FIG. 4. The pixel circuit PXC illustrated in FIG. 4 is only an example. For example, the configuration of the pixel circuit PXC may be modified and implemented.

Referring to FIG. 3, the first scan line SCLj may deliver the first scan signal SCj. The second scan line SSLj may deliver the second scan signal SSj. The data line DLi delivers a data signal Di. The data signal Di may have a voltage level corresponding to the input image signal RGB that is input to the display device DD (refer to FIG. 1).

The first driving voltage ELVDD and the initialization voltage VINT may be delivered to the pixel circuit PXC through the first voltage line VL1 and the third voltage line VL3, respectively. The second driving voltage ELVSS may be delivered to a cathode (or a second terminal) of the light emitting element ED through the second voltage line VL2.

The first transistor T1 includes a first electrode (or a drain electrode) connected to the first voltage line VL1, a second electrode (or a source electrode) electrically connected to an anode (or a first terminal) of the light emitting element ED, and a gate electrode connected to one end of the capacitor Cst. The first transistor T1 may supply a driving current to the light emitting element ED in response to the data signal Di delivered through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on depending on a first scan signal SCj received through the first scan line SCLj so as to deliver the data signal Di delivered through the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on depending on a second scan signal SSj received through the second scan line SSLj so as to deliver the initialization voltage VINT to the anode of the light emitting element ED.

As described above, one end of the capacitor Cst is connected to the gate electrode of the first transistor T1, and the other end of the capacitor Cst is connected to the second electrode of the first transistor T1. The structure of the pixel PXij according to an embodiment is not limited to the structure illustrated in FIG. 4. The number of transistors included in the pixel PXij, the number of capacitors, and the connection relationship may be modified in various manners.

Figure 5:
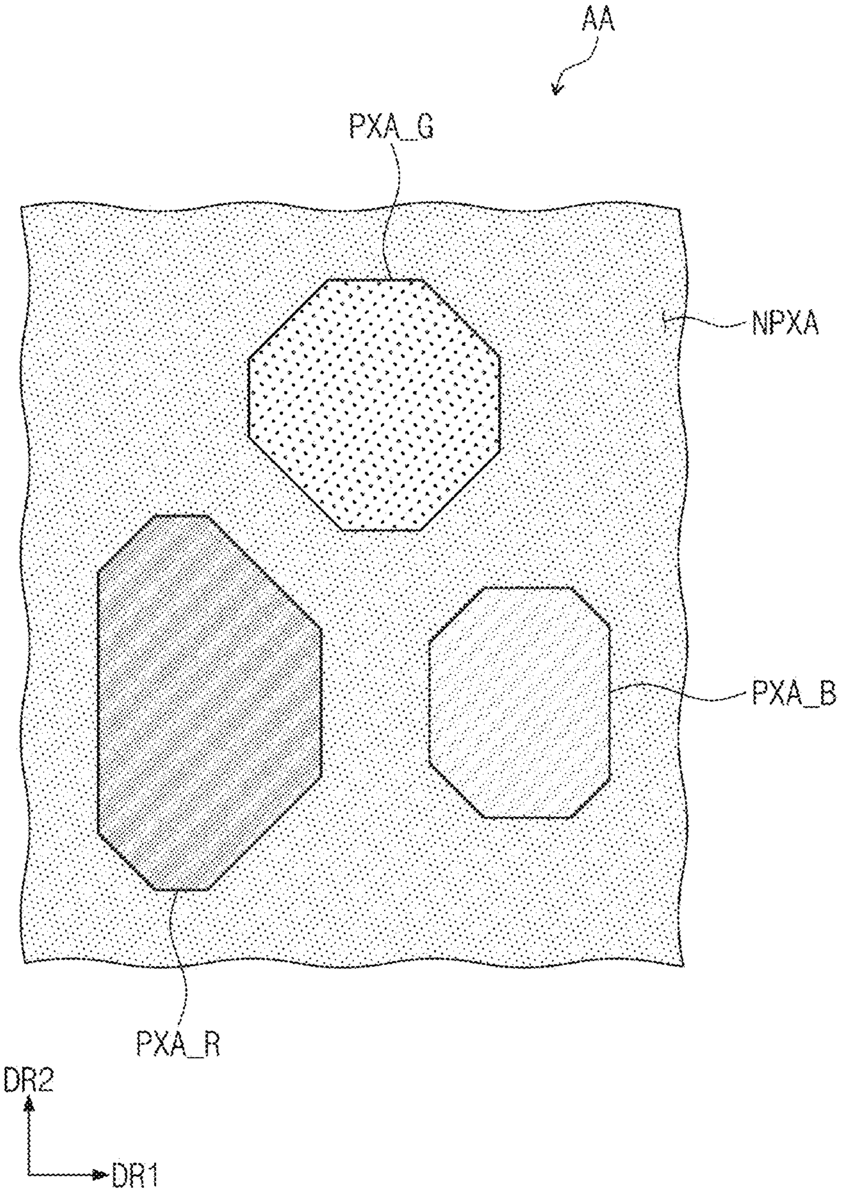
FIG. 5 is a plan view of an active area of a display panel, according to an embodiment of the present disclosure.

FIG. 5 is a plan view of an active area of a display panel, according to an embodiment of the present disclosure.

Referring to FIG. 5, first to third pixel areas (PXA_R, PXA_G, PXA_B) may be positioned in the active area AA of the display panel DP (refer to FIG. 3).

In an embodiment, the first to third pixel areas (PXA_R, PXA_G, PXA_B) may be repeatedly positioned throughout the active area AA. A peripheral area NPXA is positioned around the first to third pixel areas (PXA_R, PXA_G, PXA_B). Boundaries of the first to third pixel areas (PXA_R, PXA_G, PXA_B) are set in the peripheral area NPXA. The peripheral area NPXA prevents color from being mixed between the first to third pixel areas (PXA_R, PXA_G, PXA_B).

The first to third pixel areas (PXA_R, PXA_G, PXA_B) having different area sizes on a plane are illustrated in an embodiment, but is not limited thereto. Area sizes of at least two or more of the first to third pixel areas (PXA_R, PXA_G, PXA_B) may be the same as one another. FIG. 5 illustrates that the first to third pixel areas (PXA_R, PXA_G, PXA_B) are polygonal on a plane, but is not limited thereto. The first to third pixel areas (PXA_R, PXA_G, PXA_B) on a plane may have polygons of other shapes, such as a rectangle, a rhombus, and a pentagon.

In an embodiment, the first pixel area PXA_R may provide first color light (e.g., red light); the second pixel area PXA_G may provide second color light (e.g., green light); and, the third pixel area PXA_B may provide third color light (e.g., blue light).

The first to third pixel areas (PXA_R, PXA_G, PXA_B) may correspond to the first to third color pixels among the pixels PX shown in FIG. 3, respectively. The first to third color pixels may be red, green and blue pixels, respectively. However, the present disclosure is not limited thereto. The first to third color pixels may include not only red, green, and blue pixels, but also various color pixels such as yellow, cyan, magenta, white, and the like. Moreover, pixel areas arranged in the active area AA are not limited to the first to third pixel areas (PXA_R, PXA_G, PXA_B). Besides, the active area AA may include a plurality of pixel areas including pixels of different colors. In an embodiment, four color pixels respectively corresponding to red, green, blue, and white pixels may be positioned in the active area AA.

Figure 6:
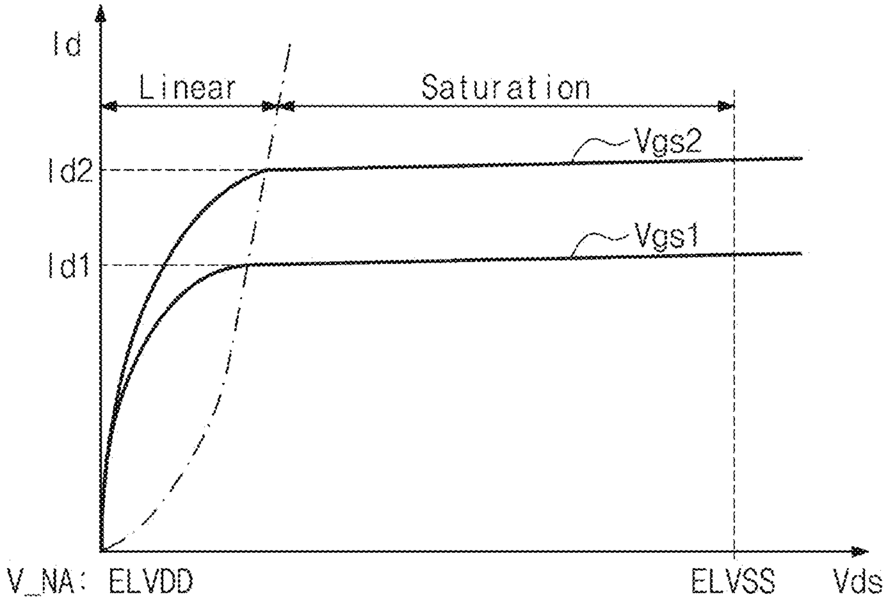
FIG. 6 is a diagram illustrating a current-voltage characteristic of a first transistor shown in FIG. 4.

FIG. 6 is a diagram illustrating a current-voltage characteristic of a first transistor shown in FIG. 4.

A horizontal axis of a graph shown in FIG. 6 indicates a voltage (i.e., a drain-source voltage Vds) between a first electrode (drain electrode) of the first transistor T1 and a second electrode (source electrode) of the first transistor T1. A vertical axis of the graph shown in FIG. 6 indicates a current Id flowing from the node NA through the first and second electrodes of the first transistor T1.

Referring to FIGS. 4 and 6, assuming that a voltage between a gate electrode of the first transistor T1 and a first electrode (source electrode) of the first transistor T1 is referred to as a gate-source voltage Vgs, the current Id flowing from the second electrode to the first electrode may be changed depending on the gate-source voltage Vgs.

Even when a drain-source voltage Vds of the first transistor T1 increases in the saturation area, a current may be maintained in a saturated state, that is, at a constant level. Furthermore, as the gate-source voltage Vgs increases in the saturation area, the current Id provided to the light emitting element ED may increase. For example, if Vgs1<Vgs2, then Id1<Id2 The current Id is changed depending on a voltage (i.e., the drain-source voltage Vds) between the first and second electrodes of the first transistor T1 in a linear area, it is not easy to adjust the luminance of the light emitting element ED.

Figure 7:
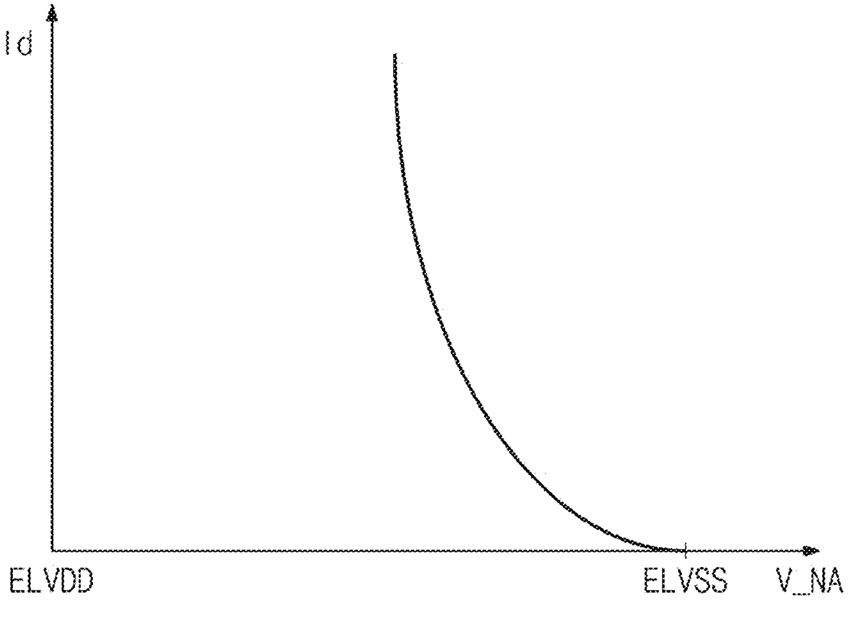
FIG. 7 is a diagram illustrating a current-voltage characteristic of a light emitting element.

FIG. 7 is a diagram illustrating a current-voltage characteristic of a light emitting element.

A horizontal axis of FIG. 7 indicates a voltage V_NA at the node NA; and, a vertical axis of FIG. 7 indicates the current Id flowing through the light emitting element ED.

Referring to FIGS. 4 and 7, the voltage V_NA at the anode of the light emitting element ED, that is, the node NA may be determined by voltage distribution between the first transistor T1 and the light emitting element ED. The voltage V_NA at the node NA may be determined such that a current (referred to as I_TFT) flowing from the first electrode of the first transistor T1 to the second electrode of the first transistor T1 is the same as a current (referred to as I_ED) flowing through the light emitting element ED.

Figure 8:
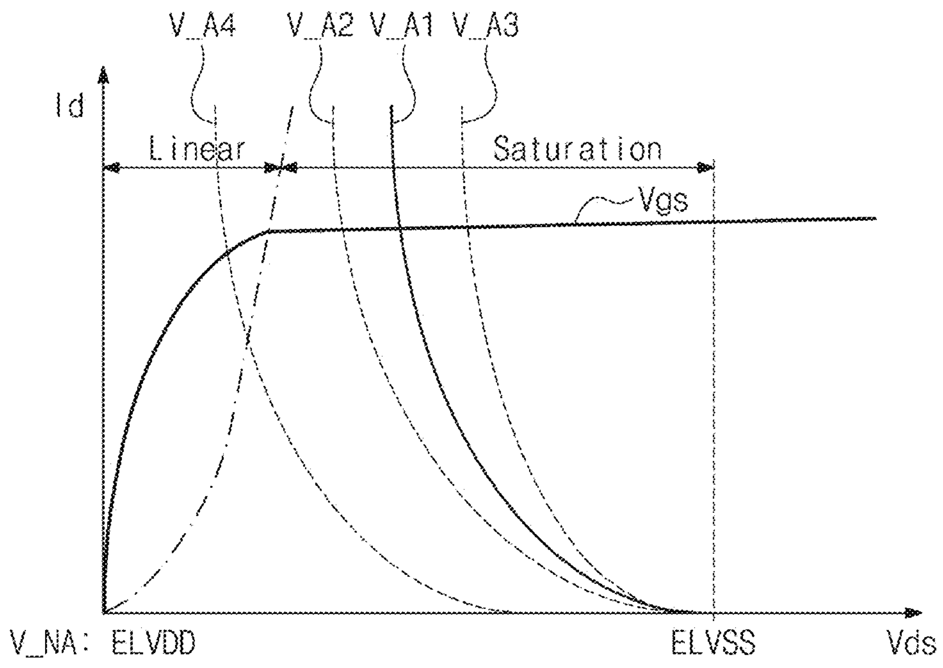
FIG. 8 is a diagram illustrating a current-voltage characteristic of a first transistor and a current-voltage characteristic of the light emitting element shown in FIG. 4.

FIG. 8 is a diagram illustrating a current-voltage characteristic of a first transistor and a current-voltage characteristic of the light emitting element shown in FIG. 4.

Referring to FIGS. 4 and 8, when a current Id flowing through the light emitting element ED increases, a current-voltage characteristic of the light emitting element ED may be changed due to a voltage drop (IR drop). For example, when current-voltage characteristics of the light emitting element ED are the same as curves (V_A1, V_A2, V_A3), the current-voltage characteristics of the first transistor T1 may be in a saturation area, and thus the pixel PXij may operate normally.

When a voltage level at the node NA is lowered due to the voltage drop, the current-voltage characteristic of the light emitting element ED may be changed to a curve V_A4. In this case, the current-voltage characteristics of the light emitting element ED overlaps the linear area of the first transistor T1, and thus a desired image may not be displayed in the pixel PXij.

A method for compensating for a voltage drop at the light emitting element ED may be used to increase a voltage level of the first driving voltage ELVDD such that the current-voltage characteristic curve V_A4 of the light emitting element ED overlaps the saturation area of the first transistor T1.

Although there is a voltage drop at the light emitting element ED when the voltage level of the first driving voltage ELVDD is high enough, the current-voltage characteristic curve of the light emitting element ED may overlap the saturation area of the first transistor T1. However, as the voltage level of the first driving voltage ELVDD increases, power consumption may increase. Accordingly, when the voltage level of the first driving voltage ELVDD is optimized, display quality may be prevented from deteriorating while power consumption is reduced.

Figure 9A:
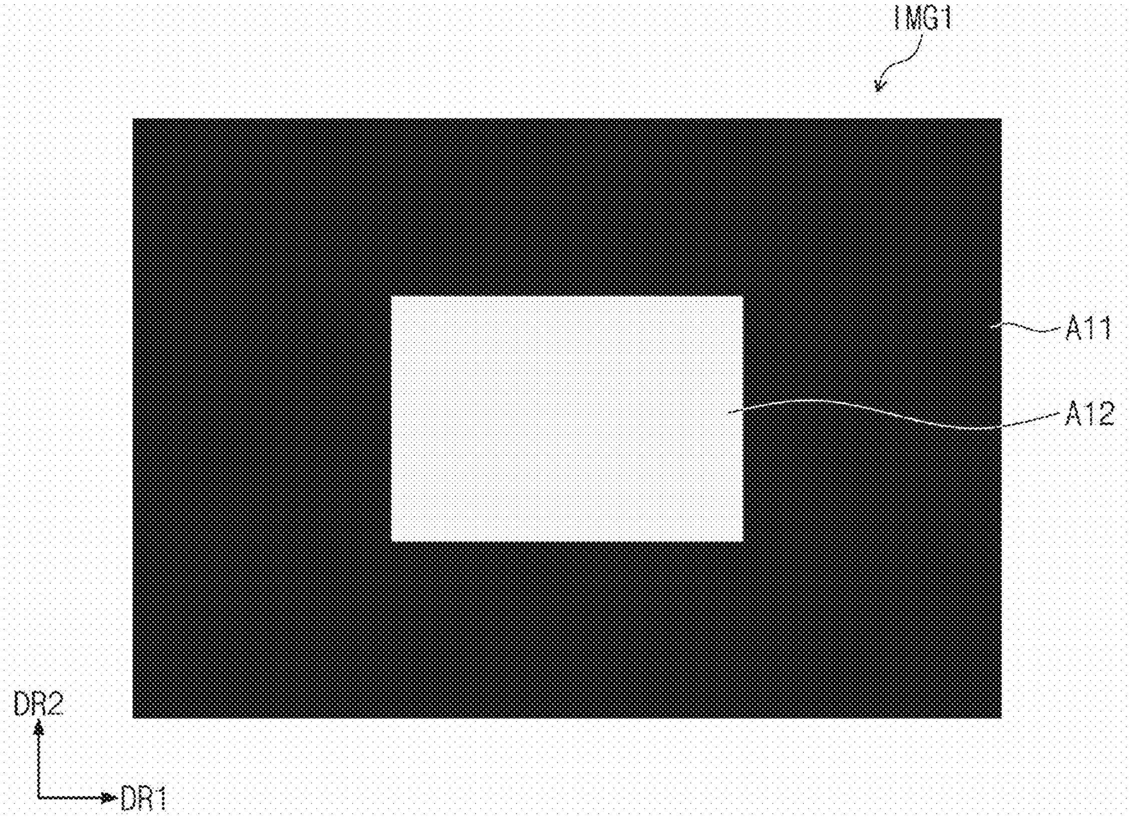
FIGS. 9A, 9B and 9C illustrate images displayed on a display device.
Figure 9B:
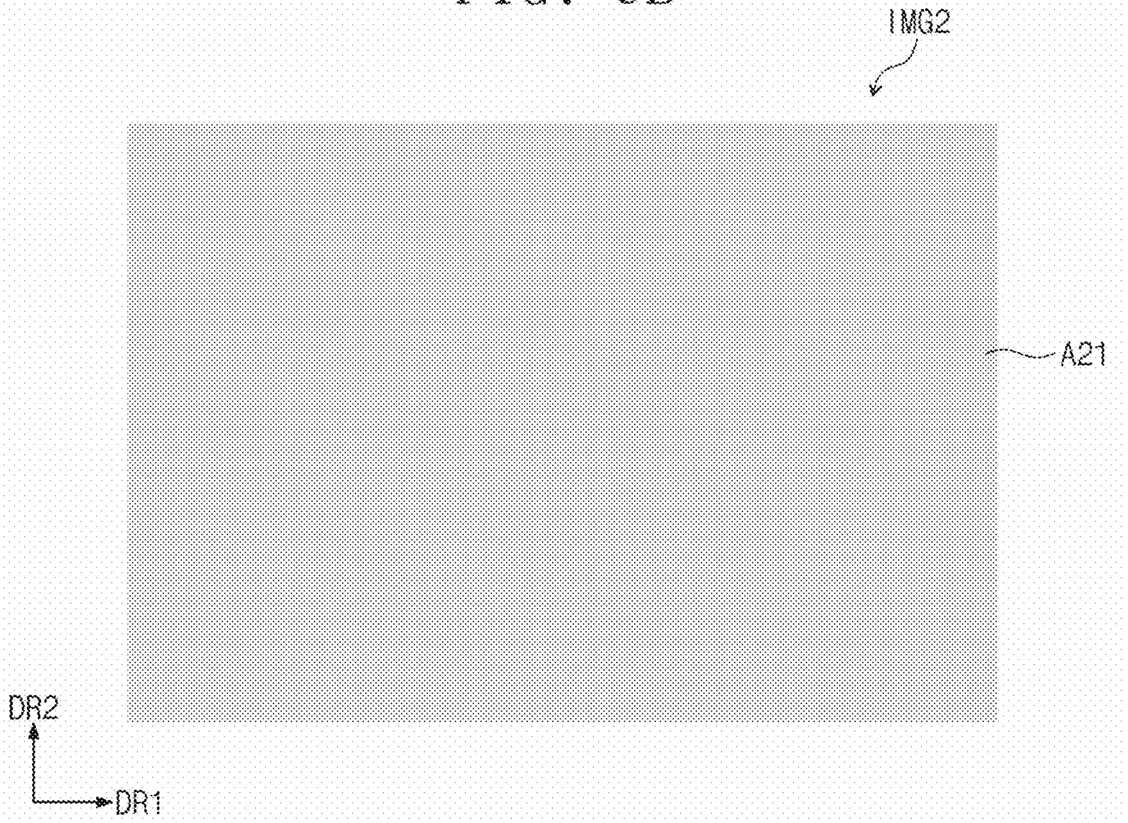
Figure 9C:
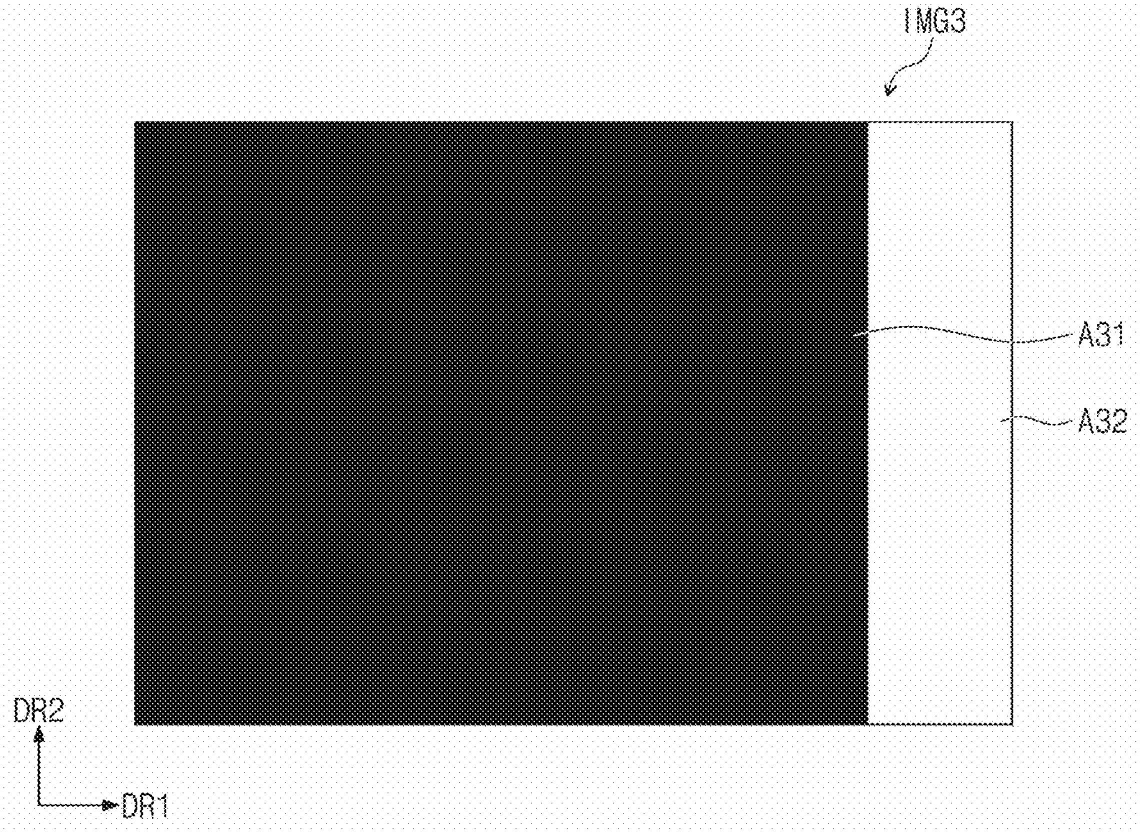

FIGS. 9A, 9B and 9C illustrate images displayed on a display device.

An image IMG1 shown in FIG. 9A includes an area A11 for displaying an image of low luminance (e.g., 10 nit) and an area A12 for displaying an image of high luminance (e.g., 1000 nit). Because the luminance of the area A11 is low, a voltage drop at the light emitting element ED shown in FIG. 4 is not great. However, because the luminance of the area A12 is high, the voltage drop at the light emitting element ED is great. Accordingly, in an embodiment, the first driving voltage ELVDD of the image IMG1 is set to a high level depending on the luminance of the area A12.

An image IMG2 shown in FIG. 9B includes an area A21 for displaying an image of high luminance (e.g., 200 nit). Because the image IMG2 shown in FIG. 9B displays the intermediate luminance in the entire area A21, the light emitting element ED may operate in the saturation area of the first transistor T1 illustrated in FIG. 8 although the first driving voltage ELVDD has a voltage level lower than the maximum voltage level.

An image IMG3 shown in FIG. 9C includes an area A31 for displaying an image of low luminance (e.g., 10 nit) and an area A32 for displaying an image of high luminance (e.g., 1000 nit).

The sub voltage lines VL11 to VL1*m* shown in FIG. 3 extend in the second direction DR2, and the plurality of pixels PX are connected to the corresponding sub voltage line among the sub voltage lines VL11 to VL1*m*.

Because the area A32 of the image IMG3 has a rectangular shape elongated in the second direction DR2, the pixels PX connected to some of the sub voltage lines VL11 to VL1*m* may display an image of high luminance. For example, when the pixels PX connected to the sub voltage line VL1*m* display an image of high luminance, a voltage drop at a pixel PX farther from the data driving circuit 200 may be greater than a pixel PX positioned adjacent to the data driving circuit 200.

Accordingly, for an image IMG3 having a shape in which an image of high luminance is elongated in the second direction DR2, in an embodiment, the first driving voltage ELVDD is set to be higher than the first driving voltage ELVDD for the image IMG1 shown in FIG. 9A.

Figure 10:
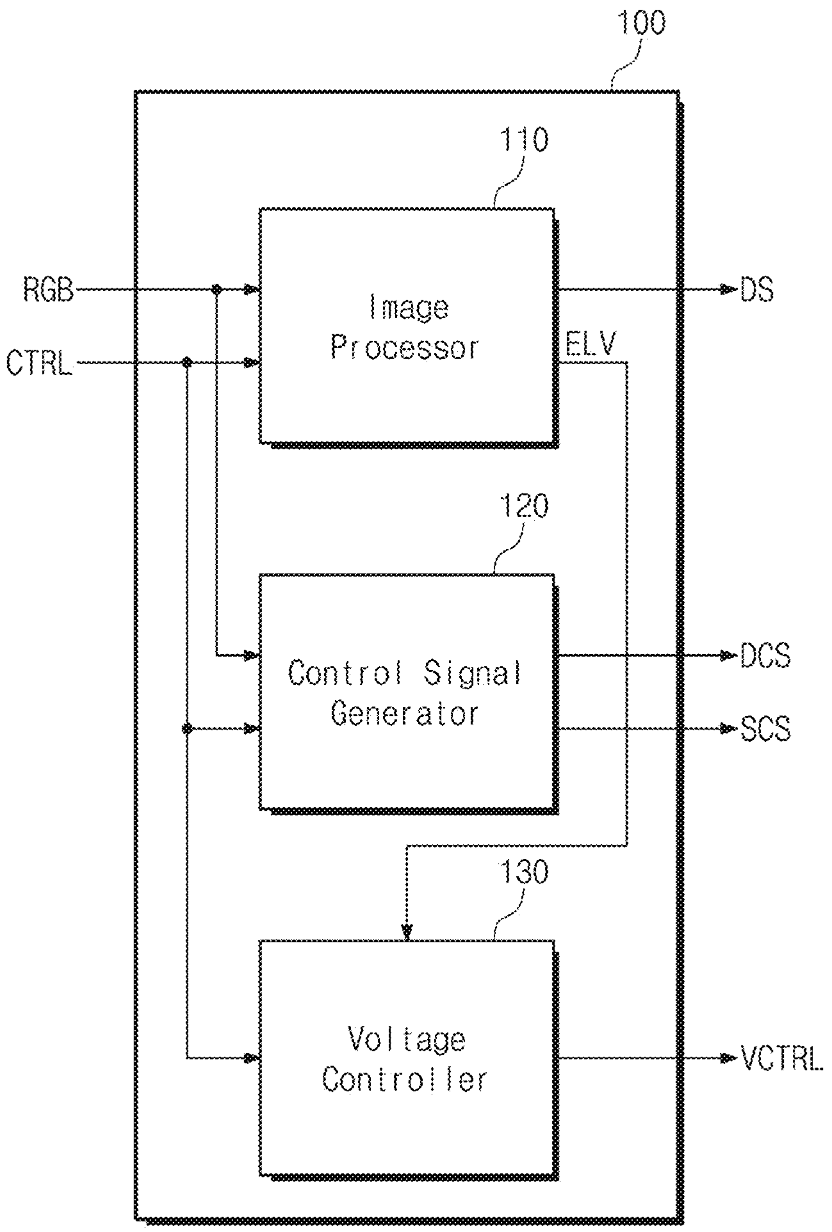
FIG. 10 is a block diagram of a driving controller, according to an embodiment of the present disclosure.

FIG. 10 is a block diagram of a driving controller, according to an embodiment of the present disclosure.

Referring to FIG. 10, the driving controller 100 includes an image processor 110, a control signal generator 120, and a voltage controller 130.

The image processor 110 outputs the output image signal DS in response to the input image signal RGB and the control signal CTRL. In an embodiment, the image processor 110 may output a voltage selection signal ELV for selecting or setting a voltage level of the first driving voltage ELVDD based on the input image signal RGB. In an embodiment, the image processor 110 may output the voltage selection signal ELV for selecting a voltage level of the first driving voltage ELVDD based on a gate-source voltage corresponding to the input image signal RGB. The gate-source voltage may be a voltage between the gate electrode of the first transistor T1 and the second electrode (or source electrode) of the first transistor T1 shown in FIG. 4 according to the input image signal RGB, and may be a value predicted in advance.

The control signal generator 120 outputs the data control signal DCS and the scan control signal SCS in response to the input image signal RGB and the control signal CTRL.

The voltage controller 130 outputs the voltage control signal VCTRL in response to the control signal CTRL and the voltage selection signal ELV. In an embodiment, the voltage controller 130 may output the voltage control signal VCTRL for changing the voltage level of the first driving voltage ELVDD in response to the voltage selection signal ELV.

The voltage control signal VCTRL may be provided to the voltage generator 300 illustrated in FIG. 3. The voltage generator 300 may change the voltage level of the first driving voltage ELVDD in response to the voltage control signal VCTRL.

Figure 11:
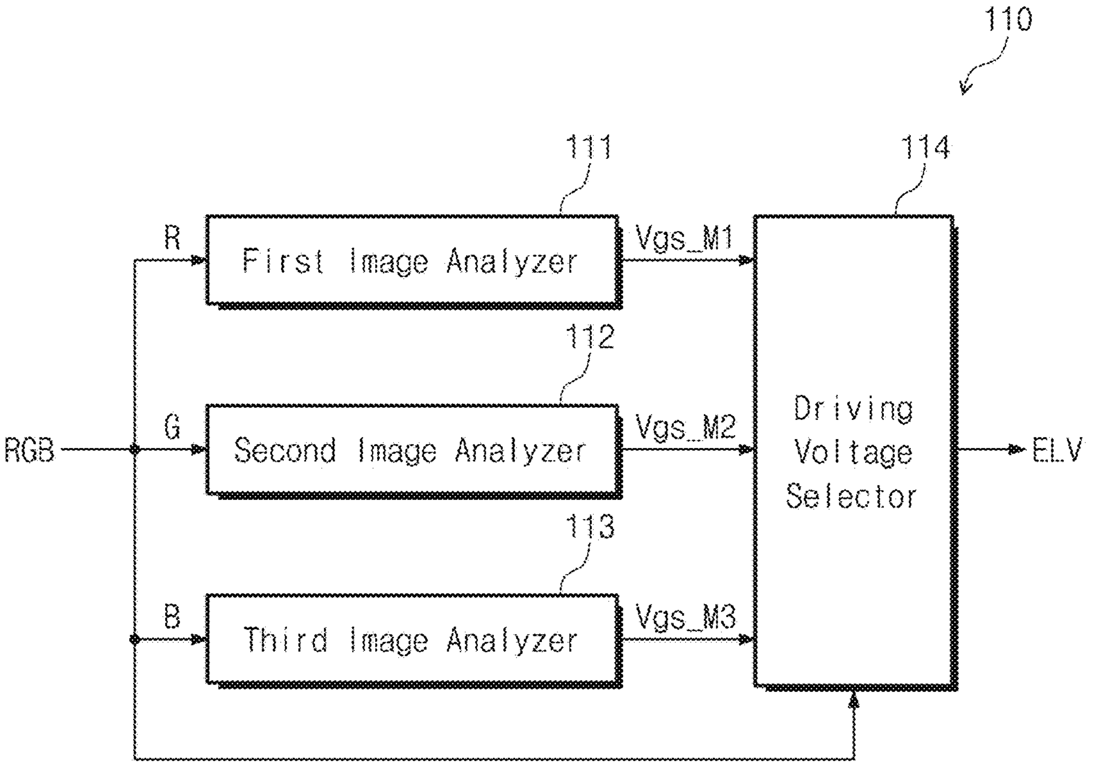
FIG. 11 is a block diagram illustrating an image processor.

FIG. 11 is a block diagram illustrating an image processor according to an example embodiment.

Referring to FIG. 11, the image processor 110 includes a first image analyzer 111 (e.g., a first logic circuit), a second image analyzer 112 (e.g., a second logic circuit), a third image analyzer 113 (e.g., a third logic circuit), and a driving voltage selector 114 (e.g., a selector circuit).

The input image signal RGB may include a first color signal (R), a second color signal (G), and a third color signal (B).

The first image analyzer 111 receives the first color signal (R) among the input image signals RGB, and outputs a first gate-source voltage signal Vgs_M1 corresponding to the first color signal (R). In an embodiment, the first image analyzer 111 searches for the highest grayscale level of the first color signal (R) during one frame or frame period. The first image analyzer 111 may determine a first gate-source voltage corresponding to the highest grayscale level of the first color signal (R) and may output the first gate-source voltage signal Vgs_M1 corresponding to the determined first gate-source voltage. For example, if a given first grayscale level or a given first intensity level in the first color signal (R) to be provided to a given pixel for displaying a red color is higher than the grayscale level or an intensity level in the first color signal (R) to be provided to the rest of the pixels for displaying the red color, then the first gate-source voltage is determined from the given first grayscale level or given first intensity level. In an embodiment, the first gate-source voltage signal Vgs_M1 indicates a value of the first gate-source voltage.

The second image analyzer 112 receives the second color signal (G) of the input image signal RGB and outputs a second gate-source voltage signal Vgs_M2 corresponding to the second color signal (G). In an embodiment, the second image analyzer 112 determines the highest grayscale level of the second color signal (G) during one frame or frame period as the second gate-source voltage, and outputs the second gate-source voltage signal Vgs_M2 corresponding to the determined second gate-source voltage. For example, if a given second grayscale level or a given second intensity level in the second color signal (G) to be provided to a given pixel for displaying a green color is higher than the grayscale level or an intensity level in the second color signal (G) to be provided to the rest of the pixels for displaying the green color, then the second gate-source voltage is determined from the given second grayscale level or given second intensity level. In an embodiment, the second gate-source voltage signal Vgs_M2 indicates a value of the second gate-source voltage.

The third image analyzer 113 receives the third color signal (B) of the input image signal RGB and outputs a third gate-source voltage signal Vgs_M3 corresponding to the third color signal (B). In an embodiment, the third image analyzer 113 determines the highest grayscale level of the third color signal (B) during one frame or frame period as a third gate-source voltage and outputs the third gate-source voltage signal Vgs_M3 corresponding to the determined third gate-source voltage. For example, if a given third grayscale level or a given third intensity level in the third color signal (B) to be provided to a given pixel for displaying a blue color is higher than the grayscale level or an intensity level in the third color signal (B) to be provided to the rest of the pixels for displaying the blue color, then the third gate-source voltage is determined from the given third grayscale level or given third intensity level. In an embodiment, the third gate-source voltage signal Vgs_M3 indicates a value of the third gate-source voltage.

The driving voltage selector 114 receives the first gate-source voltage signal Vgs_M1, the second gate-source voltage signal Vgs_M2 and the third gate-source voltage signal Vgs_M3. The driving voltage selector 114 may select one corresponding to the highest voltage level among the first gate-source voltage signal Vgs_M1, the second gate-source voltage signal Vgs_M2, and the third gate-source voltage signal Vgs_M3 and may output the voltage selection signal ELV corresponding to the selected gate-source voltage signal. In an embodiment, the voltage selection signal ELV indicates a voltage value of the highest voltage level.

In an embodiment, the driving voltage selector 114 determines an image pattern of the input image signal RGB to calculate an offset voltage. The driving voltage selector 114 may select one corresponding to the highest voltage level among the first gate-source voltage signal Vgs_M1, the second gate-source voltage signal Vgs_M2, and the third gate-source voltage signal Vgs_M3 and may output the voltage selection signal ELV based on the selected gate-source voltage signal and the offset voltage. In an embodiment, the voltage selection signal ELV indicates a voltage value of the highest voltage level and a voltage level of the offset voltage.

Figure 12:
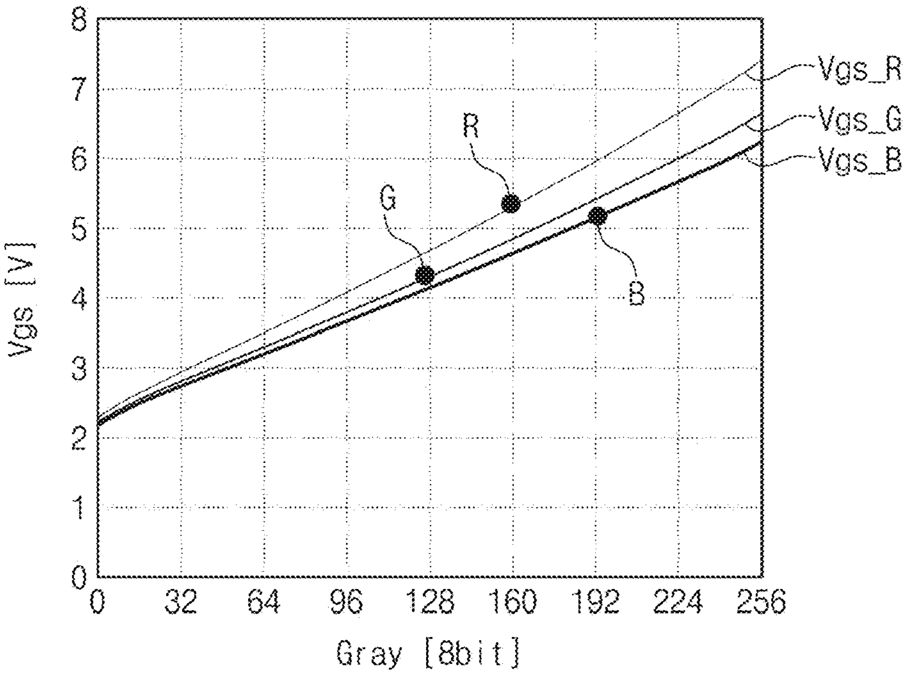
FIG. 12 is a graph illustrating a gate-source voltage according to a grayscale level of an input image signal.

FIG. 12 is a graph illustrating a gate-source voltage according to a grayscale level of an input image signal.

Referring to FIGS. 4, 11, and 12, a gate-source voltage Vgs is a voltage between a gate electrode and a second electrode (source electrode) of the first transistor T1.

As illustrated in FIG. 12, when grayscale levels of the first to third color signals (R, G, B) increase, the gate-source voltage Vgs of the first transistor T1 is generally increased. However, first to third gate-source voltage curves (Vgs_R, Vgs_G, Vgs_B) respectively corresponding to the first to third color signals (R, G, B) are slightly different from one another.

When the first to third color signals (R, G, B) have the same grayscale level as one another, the gate-source voltage Vgs corresponding to the first color signal (R) is highest, and the gate-source voltage Vgs corresponding to the third color signal (B) is lowest.

The first to third gate-source voltage curves (Vgs_R, Vgs_G, Vgs_B) respectively corresponding to the first to third color signals (R, G, B) shown in FIG. 12 are merely examples, and the present disclosure is not limited thereto. For example, the first to third gate-source voltage curves respectively corresponding to the first to third color signals (R, G, B) may be different from those shown in FIG. 12 depending on the characteristic of the display panel DP.

In an example, the grayscale level of the first color signal (R) included in the input image signal RGB is 160; the grayscale level of the second color signal (G) included in the input image signal RGB is 128; and, the grayscale level of the third color signal (B) included in the input image signal RGB is 192. In this example, the grayscale level of the third color signal (B) is higher than the grayscale level of each of the first color signal (R) and the second color signal (G). However, the gate-source voltage corresponding to the first color signal (R) has a higher voltage level than the gate-source voltage corresponding to the third color signal (B).

When the gate-source voltage of the first transistor T1 is high, the amount of current supplied to the light emitting element ED increases. This increases a voltage drop at the light emitting element ED. Display quality may be prevented from deteriorating by determining the voltage level of the first driving voltage ELVDD based on the highest gate-source voltage among the gate-source voltages respectively corresponding to the first to third color signals (R, G, B) included in the input image signal RGB.

Figure 13:
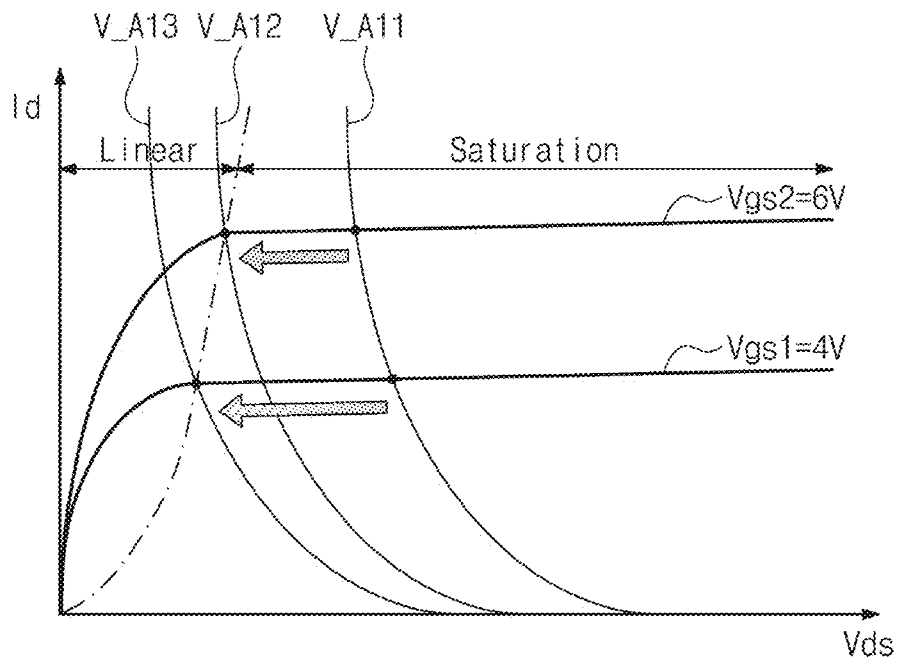
FIG. 13 is a diagram illustrating a current-voltage characteristic of a first transistor and a current-voltage characteristic of the light emitting element shown in FIG. 4.

FIG. 13 is a diagram illustrating a current-voltage characteristic of a first transistor and a current-voltage characteristic of the light emitting element shown in FIG. 4.

Referring to FIGS. 4 and 13, when the first driving voltage ELVDD is the first voltage level, a current-voltage characteristic of the light emitting element ED may correspond to a first curve V_A11.

When the first driving voltage ELVDD has the first voltage level (e.g., 25 V), the first transistor T1 may operate in a saturation area for both gate-source voltages Vgs1 (e.g., 4 V) and Vgs2 (e.g., 6 V) of the first transistor T1.

When the first driving voltage ELVDD has a second voltage level (e.g., 20 V) lower than the first voltage level, a current-voltage characteristic of the light emitting element ED may correspond to a second curve V_A12.

Although the first driving voltage ELVDD has the second voltage level (e.g., 20 V), the first transistor T1 may operate in the saturation area for both gate-source voltages Vgs1 (e.g., 4 V) and Vgs2 (e.g., 6 V) of the first transistor T1.

When the first driving voltage ELVDD has a third voltage level (e.g., 17 V) lower than the second voltage level, the current-voltage characteristic of the light emitting element ED may correspond to a second curve V_A13.

In the case where the first driving voltage ELVDD has the third voltage level (e.g., 17 V), the first transistor T1 may operate in the saturation area when the gate-source voltages Vgs of the first transistor T1 is Vgs1 (e.g., 4 V).

That is, when the voltage level of the data signal Di supplied to the pixel PXij is low, the gate-source voltage Vgs of the first transistor T1 is also lowered.

Even though the first driving voltage ELVDD is set to a second voltage level (20 V) lower than the first voltage level (25 V) when the gate-source voltage Vgs of the first transistor T1 is Vgs2 (6 V), the transistor T1 operates in the saturation area, and thus the pixel PXij may operate normally.

Even though the first driving voltage ELVDD is set to the third voltage level (17 V) lower than the first voltage level (25 V) and the second voltage level (20 V) when the gate-source voltage Vgs of the first transistor T1 is Vgs1 (4 V), the transistor T1 operates in the saturation area, and thus the pixel PXij may operate normally.

As such, the power consumed by the display device may be reduced by lowering the voltage level of the first driving voltage ELVDD when it is determined that the gate-source voltage Vgs of the first transistor T1 corresponding to the data signal Di is low or below a certain value.

The current-voltage characteristic of the first transistor T1 and the current-voltage characteristic of the light emitting element ED, which are shown in FIG. 13, are merely examples, and the present disclosure is not limited thereto. Moreover, voltage levels (e.g., 25 V, 20 V, or 17 V) of the first driving voltage ELVDD according to the gate-source voltage Vgs of the first transistor T1 are merely examples, and the present disclosure is not limited thereto. The voltage level of the first driving voltage ELVDD according to the gate-source voltage Vgs of the first transistor T1 may be variously changed.

Returning to FIG. 9A, the image IMG1 includes the area A11 for displaying an image of low luminance (e.g., 10 nit) and the area A12 for displaying an image of high luminance (e.g., 1000 nit). Accordingly, the first driving voltage ELVDD may be set to 22 V depending on the luminance of the area A12.

An image IMG2 shown in FIG. 9B includes the area A21 for displaying an image of high luminance (e.g., 200 nit). The first driving voltage ELVDD may be set to 18 V depending on the luminance in the area A21.

Figure 14A:
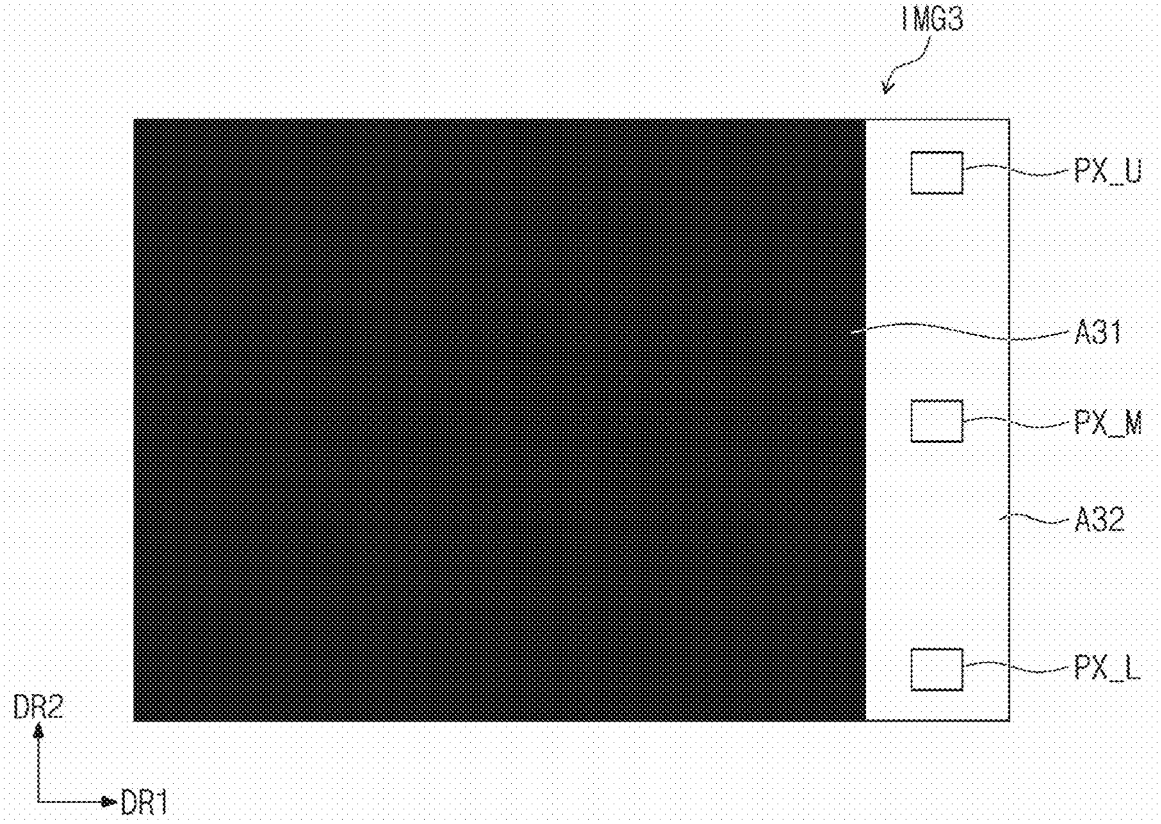
FIG. 14A is a diagram in which pixels overlapping the image shown in FIG. 9C are displayed.

FIG. 14A is a diagram in which pixels overlap the image shown in FIG. 9C are displayed.

Figure 14B:
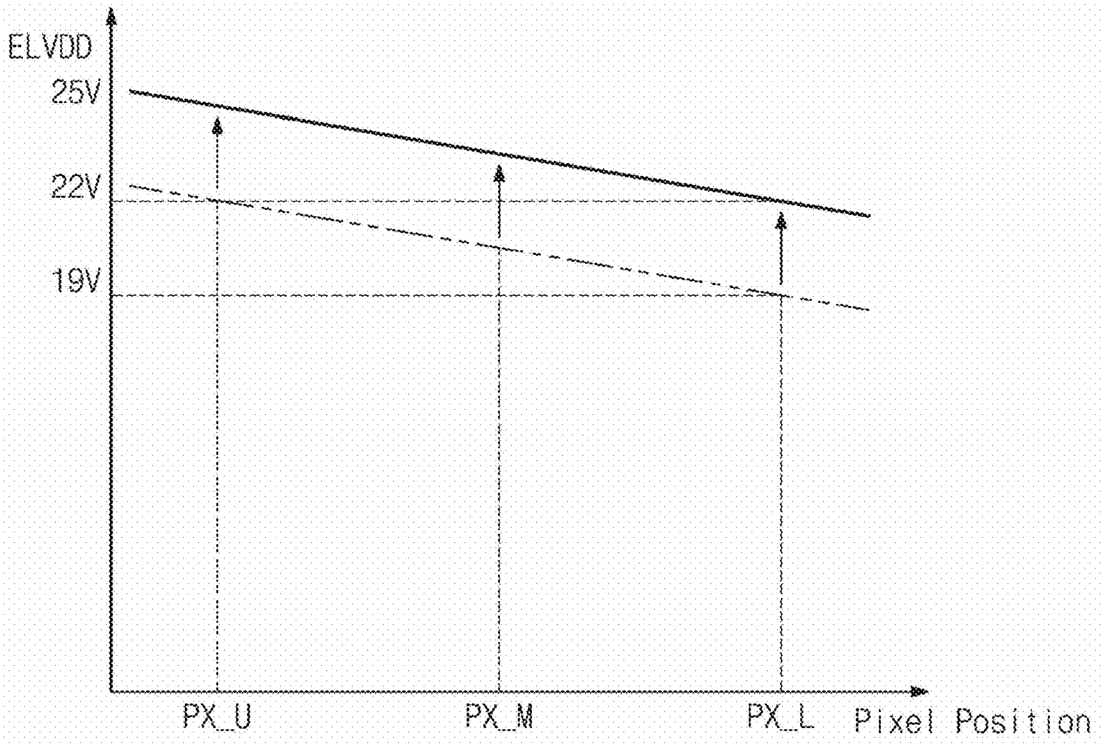
FIG. 14B is a diagram for describing a voltage drop at the pixels shown in FIG. 14A.

FIG. 14B is a diagram for describing a voltage drop at the pixels shown in FIG. 14A.

Referring to FIGS. 14A and 14B, the image IMG3 includes the area A31 for displaying an image of low luminance (e.g., 10 nit) and the area A32 for displaying an image of high luminance (e.g., 1000 nit).

The sub voltage lines VL11 to VL1*m* shown in FIG. 3 extend in the second direction DR2, and the plurality of pixels PX are connected to the corresponding sub voltage line among the sub voltage lines VL11 to VL1*m*. In an embodiment, the pixels PX positioned in the same pixel column in the second direction DR2 may be connected to the same sub voltage line among the sub voltage lines VL11 to VL1*m*.

In the example shown in FIG. 14A, the area A32 of the image IMG3 has a rectangular shape elongated in the second direction DR2. For example, when the pixels PX connected to the sub voltage line VL1*m* display an image of high luminance, a voltage drop may be greater as the pixel PX_L is farther from the data driving circuit 200 than the pixel PX_U positioned adjacent to the data driving circuit 200.

Referring to FIGS. 11 and 14B, the driving voltage selector 114 may select one corresponding to the highest voltage level among the first gate-source voltage signal Vgs_M1, the second gate-source voltage signal Vgs_M2, and the third gate-source voltage signal Vgs_M3. In an embodiment, the driving voltage selector 114 may select a gate-source voltage signal corresponding to the area A32 displaying an image of high luminance and may output the voltage selection signal ELV such that the first driving voltage ELVDD is, for example, 22 V.

When the first driving voltage ELVDD is 22 V, the pixel PX_U positioned adjacent to the data driving circuit 200 may receive the first driving voltage ELVDD of 22 V. However, the pixel PX_L far from the data driving circuit 200 may receive the first driving voltage ELVDD of 19 V, which is lower than 22 V due to a voltage drop.

Even when the first driving voltage ELVDD determines that the area A32 displaying an image of a high luminance (e.g., 1000 nit) requires a driving voltage of 22 V, the first driving voltage ELVDD higher than 22 V is provided for an image pattern that causes a voltage drop.

As illustrated in FIG. 14A, when the area A32 with high luminance has a shape elongated in the second direction DR2, the first driving voltage ELVDD is set to 25 V.

In an embodiment, the offset voltage determined depending on the image pattern of the image IMG3 shown in FIG. 14A may be 3 V.

The driving voltage selector 114 illustrated in FIG. 11 may determine an image pattern of the input image signal RGB to calculate an offset voltage. In an embodiment, when the image pattern of the input image signal RGB is not a voltage drop pattern that causes a voltage drop, the offset voltage may be zero.

In an embodiment, when the image pattern of the input image signal RGB is the voltage drop pattern, the driving voltage selector 114 may select the offset voltage such that the voltage level of the first driving voltage ELVDD is increased.

In an embodiment, when the highest grayscale level in the image pattern of the input image signal RGB is greater than a reference level and the length of the image pattern in the second direction DR2 is greater than the reference value, the driving voltage selector 114 may determine that the image pattern corresponds to the voltage drop pattern.

As described above, because the first to third gate-source voltage signals (Vgs_M1, Vgs_M2, Vgs_M3) correspond to the highest grayscale levels of the first to third color signals (R, G, B), it may be determined that the highest grayscale level of the image pattern is greater than the reference level when at least one of the first to third gate-source voltage signals (Vgs_M1, Vgs_M2, Vgs_M3) is greater than the reference voltage level.

When the length of the image pattern in the second direction DR2 is greater than the reference value, the pixel PX_L further from the data driving circuit 200 than the pixel PX_U positioned adjacent to the data driving circuit 200 may receive the first driving voltage ELVDD of a lower voltage level due to a voltage drop.

In an embodiment, when the input image signal RGB image pattern is a voltage drop pattern, the voltage level of the offset voltage may be determined depending on a size (or area) of the voltage drop pattern. For example, the voltage level of the offset voltage may be determined depending on the length of the voltage drop pattern in the second direction DR2 within the input image signal RGB. In an embodiment, as the length of the voltage drop pattern in the second direction DR2 increases, the voltage level of the offset voltage may be increased, and the voltage level of the first driving voltage ELVDD may be increased. For example, the offset voltage may be added to an initial voltage level of the first driving voltage ELVDD to generate a final voltage level of the first driving voltage ELVDD.

The driving voltage selector 114 may select one corresponding to the highest voltage level among the first gate-source voltage signal Vgs_M1, the second gate-source voltage signal Vgs_M2, and the third gate-source voltage signal Vgs_M3, which are received from the first to third image analyzers 111 to 113, and may output the voltage selection signal ELV based on the selected gate-source voltage signal and the offset voltage.

As such, as well as the gate-source voltage corresponding to the highest grayscale level of each of the first color signal (R), the second color signal (G), and the third color signal (B) included in the input image signal RGB, the image processor 110 may determine the voltage level of the first driving voltage ELVDD in consideration of an image pattern of the input image signal RGB. Accordingly, the display device DD may minimize power consumption without degrading the display quality.

Figure 15:
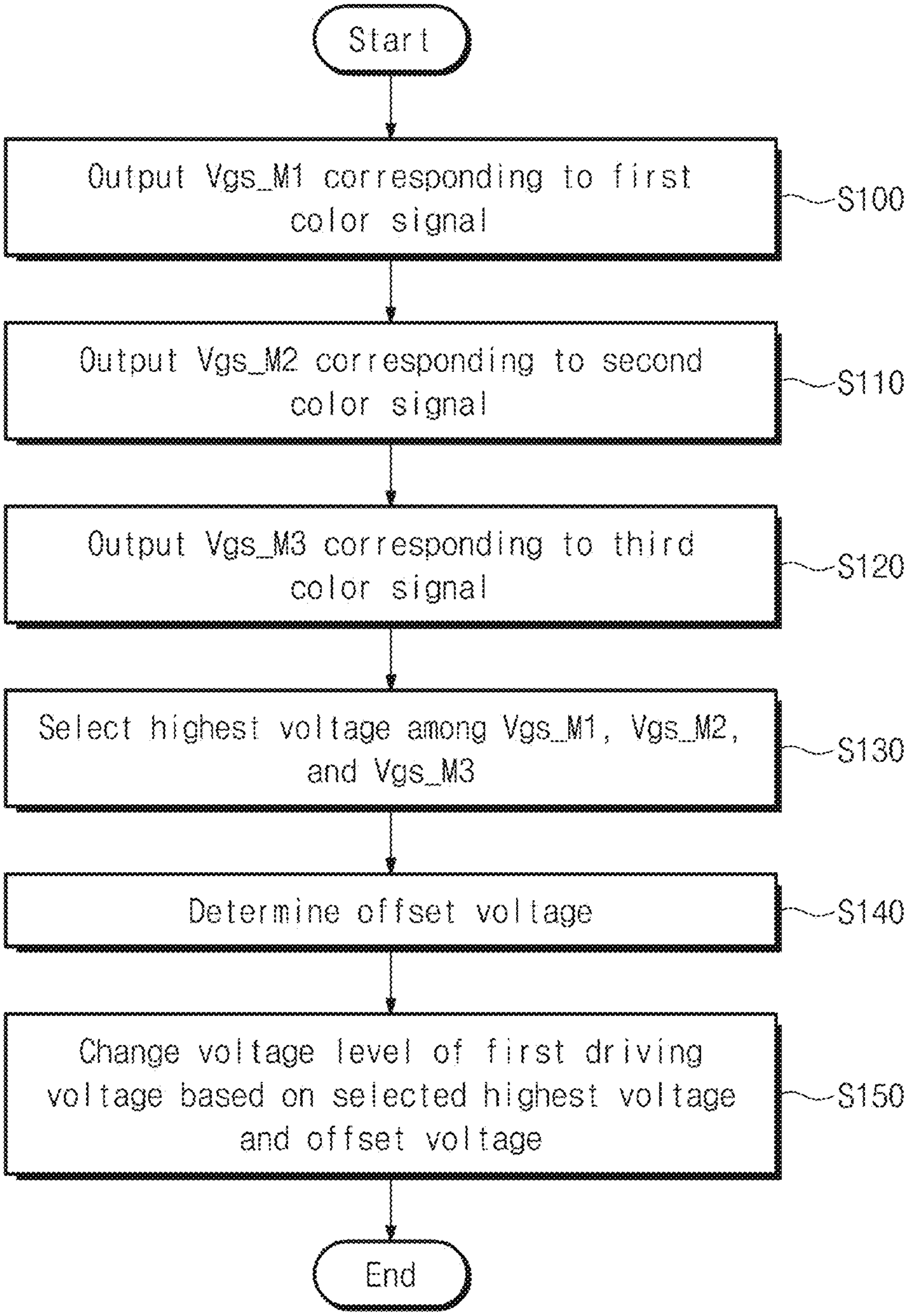
FIG. 15 is a flowchart illustrating a method of driving a display device, according to an embodiment of the present disclosure.

FIG. 15 is a flowchart illustrating a method of driving a display device, according to an embodiment of the present disclosure.

For convenience of description, a description will be given with reference to the driving controller shown in FIG. 10 and the image processor shown in FIG. 11, but the present disclosure is not limited thereto.

Referring to FIGS. 10, 11, and 15, the first image analyzer 111 outputs the first gate-source voltage signal Vgs_M1 corresponding to the first color signal (R) among the input image signal RGB (operation S100). The first gate-source voltage signal Vgs_M1 may be a gate-source voltage corresponding to the highest grayscale level of the first color signal (R) during one frame or frame period.

The second image analyzer 112 outputs the second gate-source voltage signal Vgs_M2 corresponding to the second color signal (G) among the input image signal RGB (operation S110). The second gate-source voltage signal Vgs_M2 may be a gate-source voltage corresponding to the highest grayscale level of the second color signal (G) during one frame or frame period.

The third image analyzer 113 outputs the third gate-source voltage signal Vgs_M3 corresponding to the third color signal (B) among the input image signal RGB (operation S120). The third gate-source voltage signal Vgs_M3 may be a gate-source voltage corresponding to the highest grayscale level of the third color signal (B) during one frame or frame period.

The driving voltage selector 114 may select one corresponding to the highest voltage level among the first gate-source voltage signal Vgs_M1, the second gate-source voltage signal Vgs_M2, and the third gate-source voltage signal Vgs_M3 (operation S130).

The driving voltage selector 114 determines an image pattern of the input image signal RGB to determine an offset voltage corresponding to the determined image pattern (operation S140).

The driving voltage selector 114 may output the voltage selection signal ELV for selecting the voltage level of the first driving voltage ELVDD based on the offset voltage and the highest voltage selected from the first gate-source voltage signal Vgs_M1, the second gate-source voltage signal Vgs_M2 and the third gate-source voltage signal Vgs_M3 (operation S150). The voltage controller 130 outputs the voltage control signal VCTRL in response to the voltage selection signal ELV. The output voltage selection signal ELV may change the voltage level of the first driving voltage ELVDD based on the selected highest voltage and the offset voltage. For example, the output voltage selection signal ELV may indicate the changed voltage level.

The voltage generator 300 illustrated in FIG. 3 may change the voltage level of the first driving voltage ELVDD in response to the voltage control signal VCTRL. That is, the voltage level of the first driving voltage ELVDD may be changed depending on the voltage selection signal ELV output from the driving voltage selector 114. The first driving voltage ELVDD may be provided to the pixels PX shown in FIG. 3.

As well as the gate-source voltage corresponding to the highest grayscale level of each of the first color signal (R), the second color signal (G) and, the third color signal (B) included in the input image signal RGB, the display device DD may determine the voltage level of the first driving voltage ELVDD in consideration of an image pattern of the input image signal RGB. Accordingly, the display device DD may minimize power consumption without degrading the display quality.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification.

A display device having such a configuration may change a voltage level of a first driving voltage depending on a characteristic of an input image signal. Power consumption of the display device may be minimized by optimally setting the voltage level of the first driving voltage depending on a characteristic of the input image signal.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel comprising a plurality of pixels, each of which receives a driving voltage through a first voltage line;

a driving controller configured to determine first to third gate-source voltages respectively corresponding to first to third color signals during one frame, set an offset voltage to a first value when a length of an image pattern of the first to third color signals in a certain direction is less than or equal to a reference value, set the offset voltage to a second value greater than the first value when the length is greater than the reference value, and output a voltage control signal for controlling a voltage level of the driving voltage based on the first to third gate-source voltages and the offset voltage; and a voltage generator configured to set the voltage level of the driving voltage based on the voltage control signal and provide the driving voltage to the first voltage line.

2. The display device of claim 1, wherein the driving controller outputs the voltage control signal corresponding to the highest voltage level among the first to third gate-source voltages.

3. The display device of claim 1, wherein the driving controller comprises:

an image processor configured to output a voltage selection signal based on the first to third gate-source voltages respectively corresponding to the first to third color signals; and a voltage controller configured to output the voltage control signal in response to the voltage selection signal.

4. The display device of claim 3, wherein the image processor comprises:

a first image analyzer configured to output the first gate-source voltage corresponding to the first color signal;

a second image analyzer configured to output the second gate-source voltage corresponding to the second color signal; a third image analyzer configured to output the third gate-source voltage corresponding to the third color signal; and a driving voltage selector configured to select one gate-source voltage corresponding to the highest voltage level among the first to third gate-source voltages and to output the voltage selection signal corresponding to the selected gate-source voltage.

5. The display device of claim 4, wherein the first image analyzer outputs the first gate-source voltage corresponding to the highest grayscale level of the first color signal during one frame, wherein the second image analyzer outputs the second gate-source voltage corresponding to the highest grayscale level of the second color signal during one frame, and wherein the third image analyzer outputs the third gate-source voltage corresponding to the highest grayscale level of the third color signal during one frame.

6. The display device of claim 4, wherein the driving voltage selector determines the image pattern of the first to third color signals, determines the offset voltage corresponding to the determined image pattern, and outputs the voltage selection signal based on the selected gate-source voltage and the offset voltage.

7. The display device of claim 6, wherein, when the image pattern of the first to third color signals corresponds to a voltage drop pattern, the driving controller determines the offset voltage such that the voltage level of the driving voltage is increased.

8. The display device of claim 7, wherein the plurality of pixels are positioned in a first direction and a second direction intersecting the first direction, wherein the first voltage line includes a plurality of sub voltage lines, each of which extends in the second direction and are positioned spaced from one another in the first direction, and wherein the plurality of pixels are connected to a corresponding sub voltage line among the plurality of sub voltage lines.

9. The display device of claim 8, wherein, when the highest grayscale level of the image pattern is greater than a reference level and the length of the image pattern in the second direction is greater than the reference value, the driving controller determines that the image pattern corresponds to the voltage drop pattern.

10. The display device of claim 1, wherein the plurality of pixels include first to third color pixels, and wherein the first to third color signals are provided to the first to third color pixels, respectively.

11. An electronic device comprising:

a display panel comprising a plurality of pixels, each of which receives a driving voltage through a first voltage line;

a driving controller configured to output a voltage control signal; and a voltage generator configured to provide the driving voltage to the first voltage line and to determine a voltage level of the driving voltage based on the voltage control signal, wherein the driving controller determines first to third gate-source voltages respectively corresponding to first to third color signals, determines a length of an image pattern of the first to third color signals in a certain direction, sets an offset voltage to a first value when the length is less than or equal to a reference value and to a second value greater than the first value when the length is greater than the reference value, and generates the voltage control signal based on the first to third gate-source voltages and the offset voltage.

12. The electronic device of claim 11, wherein the driving controller outputs the voltage control signal based on the offset voltage and a gate-source voltage corresponding to the highest voltage level among the first to third gate-source voltages.

13. The electronic device of claim 11, wherein, when the image pattern of the first to third color signals corresponds to a voltage drop pattern, the driving controller determines the offset voltage such that the voltage level of the driving voltage is increased.

14. An electronic device comprising:

a display panel comprising a plurality of pixels, each of which receives a driving voltage through a first voltage line;

a driving controller configured to output a voltage control signal; and a voltage generator configured to provide the driving voltage to the first voltage line and to determine a voltage level of the driving voltage based on the voltage control signal, wherein the driving controller determines first to third gate-source voltages respectively corresponding to first to third color signals, determines an offset voltage corresponding to an image pattern of the first to third color signals, and generates the voltage control signal based on the first to third gate-source voltages and the offset voltage, wherein the driving controller comprises:

an image processor configured to output a voltage selection signal based on the offset voltage and the first to third gate-source voltages; and a voltage controller configured to output the voltage control signal in response to the voltage selection signal.

15. The electronic device of claim 14, wherein the image processor comprises:

a first image analyzer configured to output the first gate-source voltage corresponding to the first color signal;

a second image analyzer configured to output the second gate-source voltage corresponding to the second color signal; a third image analyzer configured to output the third gate-source voltage corresponding to the third color signal; and a driving voltage selector configured to select one gate-source voltage corresponding to the highest voltage level among the first to third gate-source voltages and to output the voltage selection signal based on the offset voltage and the selected gate-source voltage.

16. The electronic device of claim 15, wherein the first image analyzer outputs the first gate-source voltage corresponding to the highest grayscale level of the first color signal during one frame, wherein the second image analyzer outputs the second gate-source voltage corresponding to the highest grayscale level of the second color signal during one frame, and wherein the third image analyzer outputs the third gate-source voltage corresponding to the highest grayscale level of the third color signal during one frame.

* * * * *